(12) United States Patent
Hunter et al.

(10) Patent No.: US 11,771,527 B2
(45) Date of Patent: Oct. 3, 2023

(54) LIMITED WEAR ALIGNER AND TREATMENT METHODS

(71) Applicant: SDC U.S. SMILEPAY SPV, Nashville, TN (US)

(72) Inventors: Duane Daniel Hunter, Nashville, TN (US); John Dargis, Nashville, TN (US)

(73) Assignee: SDC U.S. SMILEPAY SPV, Nashville, TN (US)

( * ) Notice: Subject to any disclaimer, the term of this patent is extended or adjusted under 35 U.S.C. 154(b) by 0 days.

(21) Appl. No.: 16/521,403

(22) Filed: Jul. 24, 2019

(65) Prior Publication Data

US 2020/0261186 A1    Aug. 20, 2020

Related U.S. Application Data

(63) Continuation-in-part of application No. 16/280,739, filed on Feb. 20, 2019, now abandoned.

(51) Int. Cl.
*A61C 7/08* (2006.01)
*A61C 7/00* (2006.01)
*A61C 13/34* (2006.01)

(52) U.S. Cl.
CPC .......... *A61C 7/08* (2013.01); *A61C 7/002* (2013.01); *A61C 13/34* (2013.01)

(58) Field of Classification Search
CPC ............ A61C 7/08; A61C 13/34; A61C 7/002
See application file for complete search history.

(56) References Cited

U.S. PATENT DOCUMENTS

| 4,348,178 | A  | 9/1982  | Kurz          |
|-----------|----|---------|---------------|
| 5,975,893 | A  | 11/1999 | Chishti et al.|
| 6,183,248 | B1 | 2/2001  | Chishti et al.|
| 6,299,440 | B1 | 10/2001 | Phan et al.   |
| 6,309,215 | B1 | 10/2001 | Phan et al.   |
| 6,334,772 | B1 | 1/2002  | Taub et al.   |
| 6,386,864 | B1 | 5/2002  | Kuo           |
| 6,390,812 | B1 | 5/2002  | Chishti et al.|
| 6,454,565 | B2 | 9/2002  | Phan et al.   |
| 6,485,298 | B2 | 11/2002 | Chishti et al.|
| 6,524,101 | B1 | 2/2003  | Phan et al.   |
| 6,572,372 | B1 | 6/2003  | Phan et al.   |

(Continued)

FOREIGN PATENT DOCUMENTS

WO    WO-2004064662 A2 *  8/2004  ............... A61C 7/08

OTHER PUBLICATIONS

International Search Report and Written Opinion for International Application No. PCT/US2019/043295, dated Oct. 2, 2019, 10 pages.

*Primary Examiner* — Heidi M Eide
(74) *Attorney, Agent, or Firm* — Foley & Lardner LLP

(57) ABSTRACT

A method for orthodontic treatment includes providing a first set of aligners to a user. The first set of aligners includes a first aligner, a second aligner, and a third aligner configured to move a tooth of a user. The first aligner, the second aligner, and the third aligner are created using a single physical dental model and are substantially the same shape. The first aligner has a first thickness, the second aligner has a second thickness, and the third aligner has a third thickness. The first thickness is different than the second thickness and the third thickness, and the second thickness is at least substantially equivalent to the third thickness.

26 Claims, 5 Drawing Sheets

(56) References Cited

U.S. PATENT DOCUMENTS

| | | |
|---|---|---|
| 6,607,382 B1 | 8/2003 | Kuo et al. |
| 6,705,861 B2 | 3/2004 | Chishti et al. |
| 6,705,863 B2 | 3/2004 | Phan et al. |
| 6,790,035 B2 | 9/2004 | Tricca et al. |
| 6,830,450 B2 | 12/2004 | Knopp et al. |
| 6,964,564 B2 | 11/2005 | Phan et al. |
| 6,976,840 B2 | 12/2005 | Taub et al. |
| 7,059,850 B1 | 6/2006 | Phan et al. |
| 7,063,533 B2 | 6/2006 | Phan et al. |
| 7,074,038 B1 | 7/2006 | Miller |
| 7,104,792 B2 | 9/2006 | Taub et al. |
| 7,121,825 B2 | 10/2006 | Chishti et al. |
| 7,125,248 B2 | 10/2006 | Phan et al. |
| 7,192,273 B2 | 3/2007 | McSurdy, Jr. |
| 7,201,576 B2 | 4/2007 | Tricca et al. |
| 7,326,051 B2 | 2/2008 | Miller |
| 7,347,688 B2 | 3/2008 | Kopelman et al. |
| 7,354,270 B2 | 4/2008 | Abolfathi et al. |
| 7,357,636 B2 | 4/2008 | Hedge et al. |
| 7,553,157 B2 | 6/2009 | Abolfathi et al. |
| 7,637,740 B2 | 12/2009 | Knopp |
| 7,641,828 B2 | 1/2010 | Desimone et al. |
| 7,648,360 B2 | 1/2010 | Kuo |
| 7,674,422 B2 | 3/2010 | Kuo |
| 7,689,310 B2 | 3/2010 | Kopelman et al. |
| 7,766,658 B2 | 8/2010 | Tricca et al. |
| 7,771,195 B2 | 8/2010 | Knopp et al. |
| 7,802,987 B1 | 9/2010 | Phan |
| 7,824,180 B2 | 11/2010 | Abolfathi et al. |
| 7,831,322 B2 | 11/2010 | Liu et al. |
| 7,854,609 B2 | 12/2010 | Chen et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,901,207 B2 | 3/2011 | Knopp et al. |
| 7,914,283 B2 | 3/2011 | Kuo |
| 7,943,079 B2 | 5/2011 | Desimone et al. |
| 7,947,508 B2 | 5/2011 | Tricca et al. |
| 8,075,309 B2 | 12/2011 | Li et al. |
| 8,152,518 B2 | 4/2012 | Kuo |
| 8,152,521 B2 | 4/2012 | Yamamoto et al. |
| 8,172,569 B2 | 5/2012 | Matty et al. |
| 8,235,713 B2 | 8/2012 | Phan et al. |
| 8,235,715 B2 | 8/2012 | Kuo |
| 8,292,617 B2 | 10/2012 | Brandt et al. |
| 8,348,665 B2 | 1/2013 | Kuo |
| 8,382,474 B2 | 2/2013 | Boltanski et al. |
| 8,439,674 B2 | 5/2013 | Li et al. |
| 8,469,706 B2 | 6/2013 | Kuo |
| 8,517,726 B2 | 8/2013 | Kakavand et al. |
| 8,523,565 B2 | 9/2013 | Matty et al. |
| 8,562,337 B2 | 10/2013 | Kuo et al. |
| 8,636,509 B2 | 1/2014 | Miller |
| 8,684,729 B2 | 4/2014 | Wen |
| 8,703,026 B2 | 4/2014 | Desimone et al. |
| 8,708,697 B2 | 4/2014 | Li et al. |
| 8,758,009 B2 | 6/2014 | Chen et al. |
| 8,765,031 B2 | 7/2014 | Li et al. |
| 8,771,149 B2 | 7/2014 | Rahman et al. |
| 8,807,999 B2 | 8/2014 | Kuo et al. |
| 8,814,564 B2 | 8/2014 | Boltanski et al. |
| 8,858,226 B2 | 10/2014 | Phan et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,944,812 B2 | 2/2015 | Kuo |
| 9,004,915 B2 | 4/2015 | Moss et al. |
| 9,022,781 B2 | 5/2015 | Kuo et al. |
| 9,084,657 B2 | 7/2015 | Matty et al. |
| 9,119,691 B2 | 9/2015 | Namiranian et al. |
| 9,241,774 B2 | 1/2016 | Li et al. |
| 9,277,972 B2 | 3/2016 | Brandt et al. |
| 9,333,052 B2 | 5/2016 | Miller |
| 9,351,809 B2 | 5/2016 | Phan et al. |
| 9,408,675 B2 | 8/2016 | Knopp et al. |
| 9,597,164 B2 | 3/2017 | Li et al. |
| 9,610,141 B2 | 4/2017 | Kopelman et al. |
| 9,655,691 B2 | 5/2017 | Li et al. |
| 9,655,693 B2 | 5/2017 | Li et al. |
| 9,662,183 B2 | 5/2017 | Lowe et al. |
| 9,675,427 B2 | 6/2017 | Kopelman |
| 9,700,384 B2 | 7/2017 | Lowe |
| 9,700,385 B2 | 7/2017 | Webber |
| 9,730,780 B2 | 8/2017 | Brawn et al. |
| 9,744,001 B2 | 8/2017 | Choi et al. |
| 9,744,002 B2 | 8/2017 | Moss et al. |
| 9,795,461 B2 | 10/2017 | Kopelman et al. |
| 9,820,829 B2 | 11/2017 | Kuo |
| 9,844,421 B2 | 12/2017 | Moss et al. |
| 9,844,424 B2 | 12/2017 | Wu et al. |
| 9,844,428 B2 | 12/2017 | Boltanski et al. |
| 9,855,701 B2 | 1/2018 | Phan et al. |
| 9,943,380 B2 | 4/2018 | Lowe |
| 10,045,835 B2 | 8/2018 | Boronkay et al. |
| 10,052,176 B2 | 8/2018 | Li et al. |
| 10,080,627 B2 | 9/2018 | Namiranian et al. |
| 10,085,822 B2 | 10/2018 | Way et al. |
| 10,085,823 B2 | 10/2018 | Cao et al. |
| 10,092,374 B2 | 10/2018 | Yamamoto et al. |
| 10,111,729 B1* | 10/2018 | Lowe .................. A61C 7/008 |
| 10,111,730 B2 | 10/2018 | Webber et al. |
| 10,123,853 B2 | 11/2018 | Moss et al. |
| 10,130,445 B2 | 11/2018 | Kopelman et al. |
| 10,136,964 B2 | 11/2018 | Borovinskih et al. |
| 10,150,244 B2 | 12/2018 | Sato et al. |
| 10,154,889 B2 | 12/2018 | Chen et al. |
| 10,172,693 B2 | 1/2019 | Brandt et al. |
| 10,201,409 B2 | 2/2019 | Mason et al. |
| 10,213,277 B2 | 2/2019 | Webber et al. |
| 10,258,432 B2 | 4/2019 | Webber |
| 10,265,141 B2 | 4/2019 | Mason et al. |
| 10,271,923 B2 | 4/2019 | Kuo et al. |
| 2002/0192617 A1 | 12/2002 | Phan et al. |
| 2003/0008259 A1 | 1/2003 | Kuo et al. |
| 2003/0190576 A1 | 10/2003 | Phan et al. |
| 2003/0211440 A1 | 11/2003 | Kuo et al. |
| 2004/0170941 A1 | 9/2004 | Phan et al. |
| 2004/0202983 A1 | 10/2004 | Tricca et al. |
| 2004/0209218 A1 | 10/2004 | Chishti et al. |
| 2005/0003319 A1* | 1/2005 | Kuo .................. A61C 7/08 433/6 |
| 2005/0181332 A1 | 8/2005 | Sernetz |
| 2005/0186524 A1 | 8/2005 | Abolfathi et al. |
| 2005/0244782 A1 | 11/2005 | Chishti et al. |
| 2006/0008760 A1* | 1/2006 | Phan .................. A61C 7/00 433/6 |
| 2006/0078841 A1 | 4/2006 | Desimone et al. |
| 2006/0099544 A1* | 5/2006 | Lai .................. A61C 7/20 433/6 |
| 2006/0105284 A1* | 5/2006 | Wilburn .................. A61C 7/08 433/6 |
| 2006/0115782 A1 | 6/2006 | Li et al. |
| 2006/0115785 A1 | 6/2006 | Li et al. |
| 2006/0188848 A1 | 8/2006 | Tricca et al. |
| 2006/0199140 A1 | 9/2006 | Wen |
| 2006/0199141 A1 | 9/2006 | Wen |
| 2006/0199142 A1 | 9/2006 | Liu et al. |
| 2006/0234179 A1 | 10/2006 | Wen et al. |
| 2006/0275731 A1 | 12/2006 | Wen et al. |
| 2007/0141527 A1* | 6/2007 | Kuo .................. G16H 20/40 433/24 |
| 2007/0178421 A1 | 8/2007 | McSurdy, Jr. |
| 2007/0207434 A1 | 9/2007 | Kuo et al. |
| 2007/0231765 A1 | 10/2007 | Phan et al. |
| 2008/0020337 A1 | 1/2008 | Phan et al. |
| 2008/0118882 A1 | 5/2008 | Su |
| 2008/0138767 A1 | 6/2008 | Kuo et al. |
| 2008/0160473 A1 | 7/2008 | Li et al. |
| 2008/0233541 A1 | 9/2008 | De Vreese et al. |
| 2008/0254402 A1 | 10/2008 | Hilliard |
| 2008/0268400 A1 | 10/2008 | Moss et al. |
| 2009/0061375 A1 | 3/2009 | Yamamoto et al. |
| 2009/0081604 A1 | 3/2009 | Fisher |

(56) References Cited

U.S. PATENT DOCUMENTS

| | | |
|---|---|---|
| 2009/0087808 A1* | 4/2009 | Soo .................. A61C 7/08 433/24 |
| 2009/0239188 A1 | 9/2009 | Ting et al. |
| 2009/0280450 A1 | 11/2009 | Kuo |
| 2010/0068671 A1 | 3/2010 | Kakavand et al. |
| 2010/0086890 A1 | 4/2010 | Kuo |
| 2010/0129763 A1 | 5/2010 | Kuo |
| 2011/0020761 A1 | 1/2011 | Kalili |
| 2011/0165533 A1 | 7/2011 | Li et al. |
| 2011/0269092 A1 | 11/2011 | Kuo et al. |
| 2012/0094246 A1 | 4/2012 | Pavlin |
| 2012/0148975 A1 | 6/2012 | Brawn |
| 2013/0280671 A1 | 10/2013 | Brawn et al. |
| 2014/0072932 A1 | 3/2014 | Brawn et al. |
| 2015/0004553 A1 | 1/2015 | Li et al. |
| 2015/0164618 A1 | 6/2015 | Heacock et al. |
| 2015/0182305 A1 | 7/2015 | Lowe et al. |
| 2015/0216627 A1 | 8/2015 | Kopelman |
| 2015/0238280 A1 | 8/2015 | Wu et al. |
| 2015/0238282 A1 | 8/2015 | Kuo et al. |
| 2015/0238283 A1 | 8/2015 | Tanugula et al. |
| 2015/0265376 A1 | 9/2015 | Kopelman |
| 2015/0320532 A1 | 11/2015 | Matty et al. |
| 2015/0366637 A1 | 12/2015 | Kopelman et al. |
| 2015/0366638 A1 | 12/2015 | Kopelman et al. |
| 2016/0081769 A1 | 3/2016 | Kimura et al. |
| 2016/0106521 A1 | 4/2016 | Tanugula et al. |
| 2016/0120621 A1 | 5/2016 | Li et al. |
| 2016/0184054 A1 | 6/2016 | Lowe |
| 2016/0193014 A1 | 7/2016 | Morton et al. |
| 2016/0199157 A1 | 7/2016 | Boronkay |
| 2016/0199216 A1 | 7/2016 | Cam et al. |
| 2016/0242871 A1 | 8/2016 | Morton et al. |
| 2016/0310235 A1* | 10/2016 | Derakhshan .......... A61C 7/002 |
| 2016/0310236 A1 | 10/2016 | Kopelman et al. |
| 2016/0310237 A1 | 10/2016 | Hung |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007364 A1 | 1/2017 | Wu et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0071705 A1 | 3/2017 | Kuo |
| 2017/0080249 A1 | 3/2017 | Brawn et al. |
| 2017/0135792 A1 | 5/2017 | Webber |
| 2017/0135793 A1 | 5/2017 | Webber et al. |
| 2017/0143452 A1 | 5/2017 | Li et al. |
| 2017/0165032 A1 | 6/2017 | Webber et al. |
| 2017/0202641 A1 | 7/2017 | Li et al. |
| 2017/0239018 A1* | 8/2017 | Kim .................. A61C 7/08 |
| 2017/0258555 A1 | 9/2017 | Kopelman |
| 2017/0273760 A1 | 9/2017 | Morton et al. |
| 2017/0274206 A1 | 9/2017 | Leonhardt et al. |
| 2017/0312538 A1 | 11/2017 | Brawn et al. |
| 2017/0319294 A1 | 11/2017 | Kakavand |
| 2017/0319296 A1 | 11/2017 | Webber et al. |
| 2018/0000564 A1 | 1/2018 | Cam et al. |
| 2018/0000565 A1 | 1/2018 | Shanjani et al. |
| 2018/0021107 A1 | 1/2018 | Benarouch et al. |
| 2018/0028281 A1* | 2/2018 | Li .................. A61C 7/002 |
| 2018/0036623 A1 | 2/2018 | Kuo |
| 2018/0071055 A1 | 3/2018 | Kuo |
| 2018/0078338 A1 | 3/2018 | Way et al. |
| 2018/0117356 A1 | 5/2018 | Brawn et al. |
| 2018/0126626 A1 | 5/2018 | Phan et al. |
| 2018/0132975 A1 | 5/2018 | Wu et al. |
| 2018/0147026 A1 | 5/2018 | Lowe |
| 2018/0153648 A1 | 6/2018 | Shanjani et al. |
| 2018/0153733 A1 | 6/2018 | Kuo |
| 2018/0168776 A1 | 6/2018 | Webber |
| 2018/0168788 A1 | 6/2018 | Fernie |
| 2018/0185119 A1 | 7/2018 | Way et al. |
| 2018/0235731 A1 | 8/2018 | Hung |
| 2018/0263730 A1* | 9/2018 | Sirovskiy .............. A61C 7/002 |
| 2018/0284727 A1 | 10/2018 | Cramer et al. |
| 2018/0303582 A1 | 10/2018 | Hung |
| 2018/0304497 A1 | 10/2018 | Kitching et al. |
| 2018/0318043 A1 | 11/2018 | Li et al. |
| 2018/0318045 A1 | 11/2018 | Boronkay et al. |
| 2018/0353264 A1 | 12/2018 | Riley et al. |
| 2018/0360565 A1 | 12/2018 | Way et al. |
| 2018/0368944 A1 | 12/2018 | Sato et al. |
| 2018/0368961 A1 | 12/2018 | Shanjani et al. |
| 2019/0000592 A1 | 1/2019 | Cam et al. |
| 2019/0000593 A1 | 1/2019 | Cam et al. |
| 2019/0008613 A1 | 1/2019 | Cao et al. |
| 2019/0021817 A1 | 1/2019 | Sato et al. |
| 2019/0029775 A1 | 1/2019 | Morton et al. |
| 2019/0038383 A1 | 2/2019 | Webber et al. |
| 2019/0046293 A1 | 2/2019 | A.P.A. et al. |
| 2019/0046295 A1 | 2/2019 | Morton et al. |
| 2019/0046296 A1 | 2/2019 | Kopelman et al. |
| 2019/0046297 A1 | 2/2019 | Kopelman et al. |
| 2019/0053878 A1 | 2/2019 | Cao et al. |
| 2019/0076216 A1 | 3/2019 | Moss et al. |
| 2019/0076217 A1 | 3/2019 | Namiranian et al. |
| 2019/0105829 A1 | 4/2019 | Sato et al. |

\* cited by examiner

LIMITED WEAR ALIGNER AND TREATMENT METHODS

CROSS REFERENCE TO RELATED APPLICATION

This application is a Continuation-In-Part of U.S. patent application Ser. No. 16/280,739, filed Feb. 20, 2019, which is incorporated herein by reference in its entirety.

BACKGROUND

The present disclosure relates generally to dental aligners. More specifically, the present disclosure relates to dental aligners designed for limited-wear protocols.

Conventional dental aligners use a series of plastic trays to mechanically move the teeth of a user to a desired location over time. The plastic trays are custom made to fit tightly over the teeth to force the teeth to move to the desired location. Typical dental aligners require the user to wear the aligners for a significant amount of time each day (e.g., twenty-two hours per day) according to a treatment plan to achieve the desired results. Users are advised to remove the aligners for certain activities, such as eating, brushing their teeth, smoking, chewing gum, and so on. As such, the user is not required to wear the aligner continuously for twenty-four hours per day. Rather, the twenty-two hour requirement is typically prescribed because it maximizes the amount of time that aligners are worn during each day while taking into account activities people partake in where wearing an aligner is not recommended (e.g., eating, etc.). By maximizing the amount of time that aligners are worn each day, the total overall duration of the treatment plan is kept to a minimum. Reducing an overall duration of a treatment plan is generally desirable to the patient and advantageous because, after about a year of wearing aligners, users are more inclined to deviate from a treatment plan or cease treatment altogether. Moreover, maximizing the amount of time that aligners are worn each day is believed to be beneficial to the user as it minimizes the possibility of cycling between positions in which the aligner forces the teeth in one direction and positions in which the teeth revert to their previous positions.

Despite the conventional recommended daily wear time, many users do not adhere to the recommended wear time and instead wear the aligners for less time, or even not at all some days. Some users may forget to put the aligners on their teeth before leaving their home for the day or after brushing their teeth and before going to bed. Other users may avoid wearing aligners at points during the day because they feel the aligners alter the way they speak or sound to others. Other users may simply choose to stop using the aligners because the duration of the treatment is too long and they do not want to use the aligners any more.

Wearing aligners for less than the recommended time per day can have a variety of negative consequences, such as having to alter the prescribed treatment plan to accommodate the user's deviation, causing inconvenience (particularly where the user's treatment plan deviations lead to the need to obtain new dental scans and new aligners) and potentially causing the user to stop treatment altogether. In addition, user deviations that lead to cycling between positions in which the aligner forces the teeth in one direction and positions in which the teeth revert to their previous positions can provide unsatisfactory results. Simply requiring a non-compliant user to wear a particular aligner for a longer period of time is insufficient to address these issues because over time, the plastic material can wear out, providing less force to the teeth the longer an aligner is worn. It is therefore important to design a treatment plan with which a user can easily and conveniently comply and which will provide the user with aligners that impart a sufficient amount of continuous force to the teeth to move the teeth to the desired location.

An improved limited-wear aligner and treatment protocol is desirable to decrease the recommended daily wear time without diminishing the overall treatment effect.

SUMMARY

According to one aspect of the disclosure, a method for orthodontic treatment includes providing a first set of aligners to a user. The first set of aligners includes a first aligner, a second aligner, and a third aligner configured to move a tooth of a user. The first aligner, the second aligner, and the third aligner are created using a single physical dental model and are substantially the same shape. The first aligner has a first thickness, the second aligner has a second thickness, and the third aligner has a third thickness. The first thickness is different than the second thickness and the third thickness, and the second thickness is at least substantially equivalent to the third thickness.

According to another aspect of the disclosure, a method for orthodontic treatment includes providing a first set of aligners to a user. The first set of aligners includes a first aligner having a first thickness, a second aligner having a second thickness, and a third aligner having a third thickness, where the first aligner, the second aligner, and the third aligner are configured to move a tooth of a user. The first aligner, the second aligner, and the third aligner are substantially the same shape. The first thickness is different than the second thickness and the third thickness. The second thickness is at least substantially equivalent to the third thickness.

According to another aspect of the disclosure, a method for orthodontic treatment includes providing a first set of aligners to a user. The first set of aligners includes a first aligner having a first thickness, a second aligner having a second thickness, a third aligner having a third thickness, and a fourth aligner having a fourth thickness, where the first aligner, the second aligner, the third aligner, and the fourth aligner are configured to move the tooth of a user when worn in sequence. The first aligner, the second aligner, the third aligner, and the fourth aligner are substantially the same shape. The second thickness is thicker than the first thickness, the third thickness is thicker than the second thickness, and the fourth thickness is at least substantially equivalent to the third thickness.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

A treatment plan using conventional dental aligners may require a user to wear the aligners for a substantial part of a day (e.g., twenty-two hours per day) for a predetermined number of months (e.g., eighteen months). However, some users may only desire to wear dental aligners when at home, or when sleeping. A user that wears the aligners less than an amount of time dictated by a treatment plan typically would not achieve the results desired by the treatment plan by the end of the treatment plan. Such a user may be more interested in utilizing a modified dental aligner or modified dental aligner treatment plan that reduces wear time (e.g., daily wear time, number of days wearing the aligner).

Figure 1:
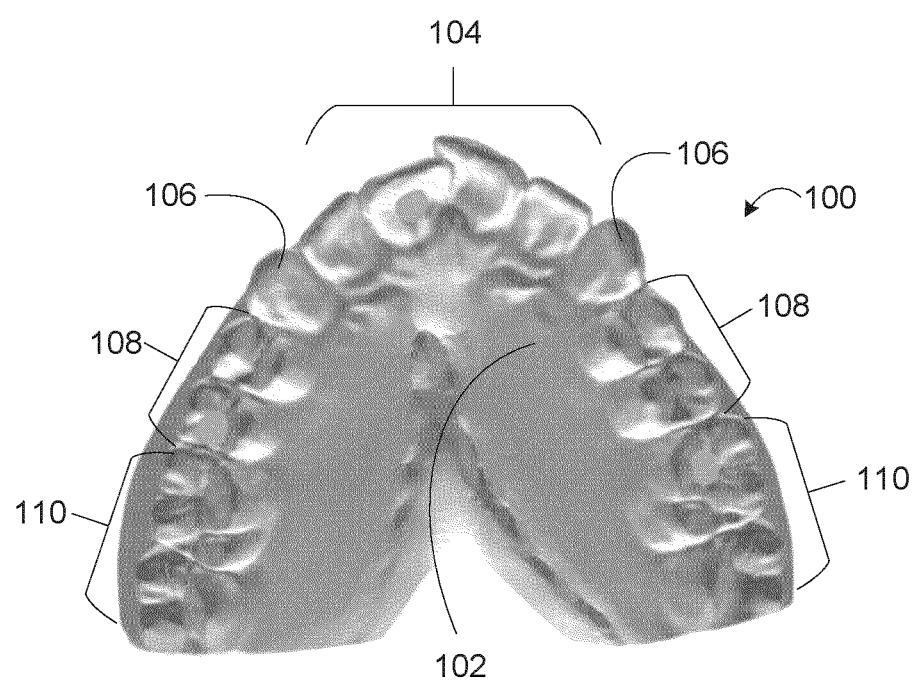
FIG. 1 is a top/occlusal view of a three-dimensional (3-D) model of teeth, according to some embodiments.

Referring to FIG. 1, a top/occlusal view of a 3-D model 100 of teeth 102 is shown, according to some embodiments. When users desire to realign their teeth, they may determine that the desired way to realign their teeth is by using dental aligners. In such cases, a 3-D model 100 of the user's teeth 102 is made. The 3-D model 100 can be created by scanning the teeth directly with a 3-D scanner, in which case the 3-D model 100 would be generated directly from the teeth of a user. Additionally or alternatively, a user may make impressions of their teeth 102 using an impression kit, and the impressions can then be scanned by a 3-D scanner to create the 3-D model 100.

The 3-D model 100 shows the locations of the incisors 104, the cuspids 106, the bicuspids 108, and the molars 110 at the time the teeth of the user are scanned. These locations are loaded into a computer, and the computer determines a treatment plan for moving the teeth of the user such that, after wearing the aligners according to the treatment plan, one or more of the teeth of the user are repositioned (e.g., to be straight).

Figure 2:
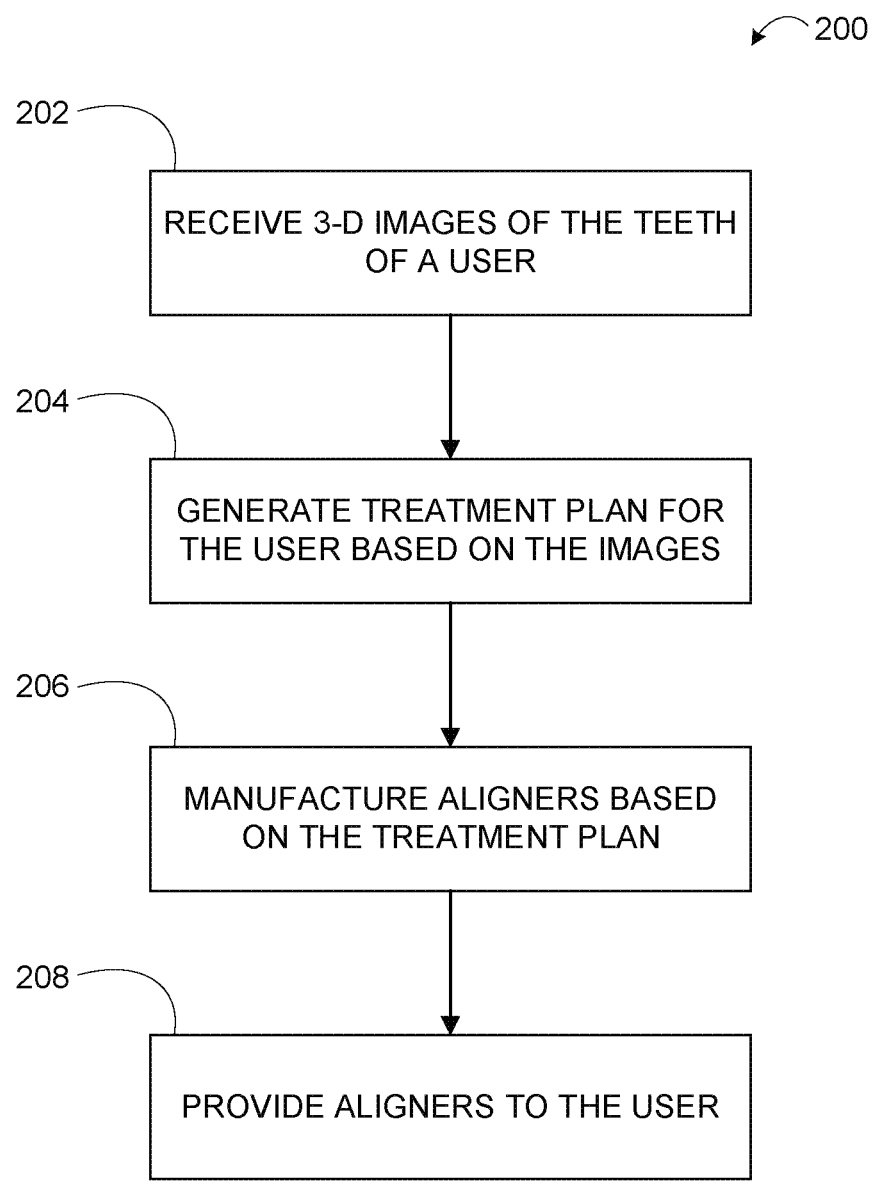
FIG. 2 is a flow diagram of a method for creating a dental aligner, according to some embodiments.

Referring now to FIG. 2, a flow diagram of a method 200 for creating dental aligner is shown, according to some embodiments. At 202, 3-D images of the teeth of a user are received. In order for dental aligners to properly reposition the teeth of the user, an accurate model of the initial position of the teeth of the user must be generated. In some embodiments, the user may have access to a 3-D scanning system (e.g., by visiting a location associated with a manufacturer of dental aligners, using a mobile scanning system), and the 3-D scanning system is configured to scan the teeth of the user to create electronic images of the teeth of the user. In some embodiments, the user may not have access to a 3-D scanning system or prefer not to use such a system. In such cases, the user can create physical dental impressions of their teeth. For example, the impressions can be created by a professional in a professional office setting (e.g., at a dentist or orthodontist office). In another example, the impressions can be created by the user using a dental impression kit. After the user makes the impressions, the impressions can be scanned by 3-D scanner to create electronic images of the teeth of the user.

At 204, a treatment plan for the user is generated based on the images of the teeth of the user. After the 3-D images of the teeth of the user are received, a computer model of the teeth of the user is generated (e.g., the 3-D model 100). The computer model can include the 3-D images of the initial position of the teeth of the user. The computer model can also include the 3-D images of the desired final position of the teeth of the user. Based on the 3-D images of the initial position and desired final position of the teeth of the user, a treatment plan for the user can be created. Creating the treatment plan can include creating additional 3-D images of the teeth of the user to depict the incremental movement of the teeth during the treatment plan, from the initial position to the desired final position. The treatment plan can include using one or more aligners corresponding to the 3-D images of the teeth of the user to reposition the teeth of the user over the duration of the treatment plan. Additional treatment plan embodiments will be further described with reference to FIG. 3.

At 206, the aligners are manufactured based on the treatment plan. Any appropriate technique may be used to manufacture the aligners. For example, the aligners may be manufactured by 3D printing physical models of the teeth of the user based on the computer model, and then molding plastic aligners (e.g., by a thermoforming process) using the physical models.

At 208, the aligners are provided to the user. In some embodiments, multiple aligners may be distributed to the user in a single shipment. For example, the user may be sent all aligners required by the treatment plan, with instructions indicating the order that the aligners should be worn and the duration for each aligner to be worn. In another example, the user may be sent three aligners each month, with the first aligner to be worn for one week, the second aligner to be worn for one week, and the third aligner to be worn for two weeks.

Figure 3:
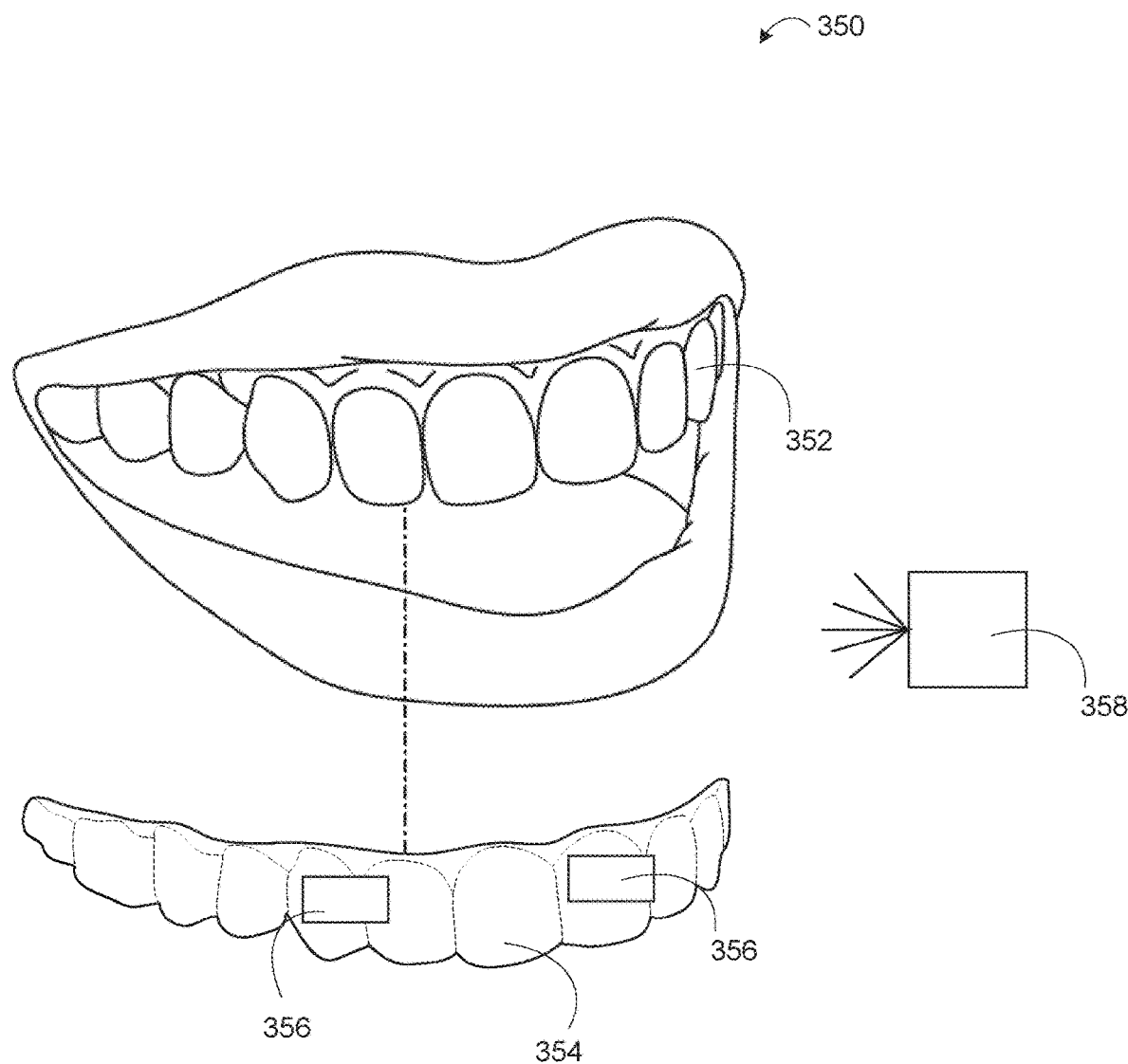
FIG. 3 is a diagram of a system for promoting movement of a user's teeth, according to some embodiments.

Referring now to FIG. 3, a system 350 for promoting movement of a user's teeth is shown, according to some embodiments. As shown, the system 350 includes a dental aligner 354 configured to be worn over the user's teeth 352, an integrated light source 356, and an external light source 358. The dental aligner 354 can be manufactured based on the treatment plan.

In some embodiments, light therapy can be incorporated into the treatment method to aid in the movement of the teeth 352. Applying light to the teeth 352 and the surrounding gingival tissue and oral environment can have the effect of promoting bone remodeling and reducing pain, both of which can increase the movement velocity of the teeth 352 and promote a more consistent rate of tooth movement. The integrated light source 356 and the external light source 358 can include low level lasers, light emitting diodes (LEDs), near-infrared light, or any other light that can have the effect of increasing the movement velocity of teeth. Using such light therapy in combination with the treatment method may serve to increase the movement the velocity of the teeth, thereby reducing the wear time required to achieve the desired results. For example, a user can use a light therapy device that emits light at a wavelength of 850 nanometers. For example, using such a device for approximately ten minutes per day in conjunction with the aligner 300 can increase the movement velocity of the teeth 352, thereby reducing the overall treatment time.

In some embodiments, the dental aligner 354 includes the integrated light source 356 such that the integrated light source 356 provides the teeth 352 with light therapy. The integrated light source 356 may include any of the types of light described herein. In some embodiments, the integrated light source 356 turns on when the dental aligner 354 is placed over the teeth 352. In some embodiments, the integrated light source 356 may operate on a timer such that the light is emitted for duration according to the treatment plan. In some embodiments, the integrated light source 356 can be activated by a user (e.g., by touching the integrated light source 356 to activate the light).

In some embodiments, the dental aligner 354 does not include the integrated light source, and the light is provided to the teeth 352 and gingiva by the external light source 358. The external light source 358 may include any of the types of light described herein. In some embodiments, the external light source 358 is used when the user is not wearing the dental aligner 354. In some embodiments, the external light source is used when the user is wearing the dental aligner 354. In some embodiments, the external light source 358 operates on a timer such that the light is applied to the teeth 352 and gingiva for a duration according to the treatment plan.

In some embodiments, the treatment can include both the dental aligner 354 with the integrated light source 356 and the external light source 358. In some embodiments, the light from the integrated light source 356 can be applied to the teeth 352 and the gingiva at the same time as the light from the external light source 358. In some embodiments, the light from the integrated light source 356 can be applied to the teeth 352 at a different time than the light from the external light source 358. In some embodiments, the type of light from the integrated light source 356 is different than the type of light from the external light source 358. For example, the integrated light source 356 can be a low-level laser and the external light source 358 can be an LED. In some embodiments, the integrated light source 356 is an optical element that receives and reflects light from the external light source 358. While the external light source 358 is shown to be external from a mouth of the user, it will be appreciated that the external light source 358 can be positioned at least partially within the user's mouth during operation. For example, the external light source 358 can be a mouth guard that is configured to be worn by the user separate from the dental aligner 354 or while the user is also wearing the dental aligner 354.

Figure 4:
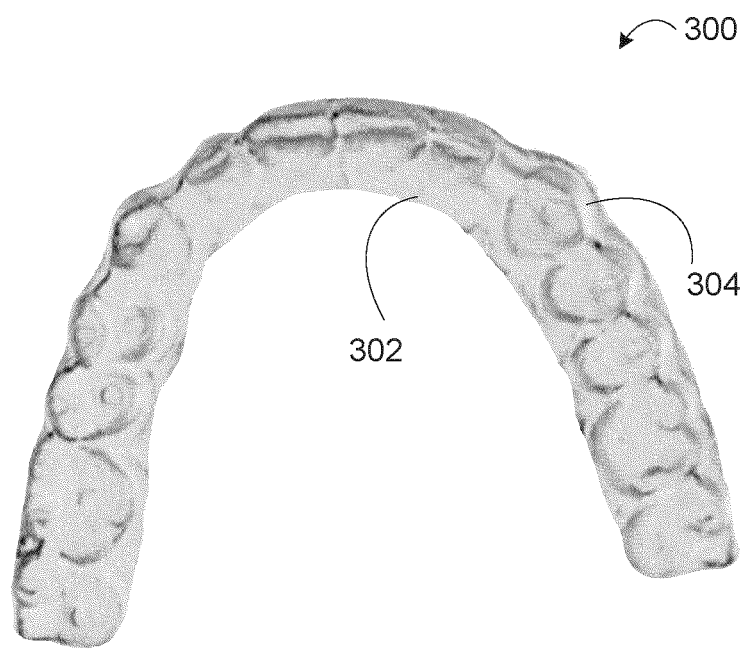
FIG. 4 is a top/occlusal view of a dental aligner, according to some embodiments.

Referring now to FIG. 4, a top/occlusal view of a dental aligner 300 is shown, according to some embodiments. As shown, the dental aligner 300 does not include any performance enhancing structures (e.g., such as the metal 402 of the aligner of FIG. 4), and can be either one of the first, last, or intermediate aligners worn by the user to move the user's teeth to the desired location according to the treatment plan. The dental aligner 300 can be manufactured based on the treatment plan.

To achieve the desired results by wearing the aligners for a reduced time, the physical properties of the aligners may be modified. Conventional aligners are typically constructed from a plastic material that tends to lose its elasticity over time such that the shape of the aligner after the user wears it is different than the shape of the aligner before the user wears it. This is one of the reasons a recommended wear time can be twenty-two hours per day and the treatment duration can be more than a year. To reduce the recommended wear time without significantly changing the overall treatment duration, the material of aligner 300 can be modified. In some embodiments, modifying the aligner 300 can change the overall treatment plan generated at step 204.

In some embodiments, the thickness of the material of the aligner 300 can be increased to prevent the aligner 300 from losing its elasticity over time. The material itself may not change, but the aligner 300 can be made thicker with the same material as it is conventionally made. The thicker material would resist losing its elasticity over time more than a thinner material. The thicker material may also exert a higher force on the teeth of the user such that the teeth move at a higher velocity when compared to an aligner not made with a thicker material. In some embodiments, the thickness of the material of the aligner 300 can vary across the aligner 300 such that thicker sections of the aligner 300 may be more resistant to permanent deformation than thinner sections. In such embodiments, varying the thickness of the material of the aligner 300 can create variable, non-constant forces (or non-constant force directions) on the teeth.

For example, the thickness of the material of the aligner 300 can be variable such that when the aligner is worn by a user a variable, non-constant force is applied to a first tooth and a non-variable, constant force is applied to a second tooth. In another example, the thickness of the material of the aligner 300 can be variable such that when the aligner is worn by a user a non-constant force direction is applied to a first tooth (e.g., applying force to the first tooth initially in a first direction and then applying force to the first tooth in a second direction) and a constant force direction is applied to a second tooth.

In some embodiments, the physical structure of the material of the aligner 300 can be modified to prevent the aligner 300 from permanently deforming under load. In some embodiments, the material of the aligner 300 can be a honeycomb structure (e.g., an array of hollow cells formed between solid walls). In other embodiments, the material of the aligner 300 can be corrugated (e.g., transverse ripples formed between solid walls). In some embodiments, the material of the aligner 300 can be a lattice-type structure (e.g., an array of interconnected struts formed between solid walls).

In some embodiments, the material of the aligner 300 may be modified to make the material less elastic. To make the material of the aligner 300 less elastic, antiplasticizers can be added to the material. Antiplasticizers can have the effect of increasing the modulus of elasticity of a material, making the material maintain its original shape or to make the material less likely to permanently deform when under load. With antiplasticizers included in the material of aligner 300, the likelihood of the aligner 300 to deform when under load from the teeth 352 is lower. In some embodiments, the addition of antiplasticizers to the material of aligner 300 can be combined with making the material of aligner 300 thicker, thereby decreasing the elasticity of aligner 300 and increasing the velocity of the movement of the teeth 352. Examples of antiplasticizers include tricresyl phosphate and dibutylphthalate. Using antiplasticizers alone, or in combination with a thicker material, can allow aligner 300 to move the teeth 352 in such a way as to decrease the required wear time per day while not significantly increasing the overall duration of treatment. In some embodiments, antiplasticizers can be incorporated into the material of the aligner 300 in a homogeneous manner such that the modulus of elasticity of the aligner 300 is consistent throughout the aligner 300. In some embodiments, antiplasticizers can be incorporated into the material of the aligner 300 in a non-homogeneous manner. For example, the incisors 104 may need to move more than the molars 110 over the treatment duration. To cause greater movement of the incisors 104, antiplasticizers can be incorporated into the aligner 300 only in the area of the incisors 104. In this way, the incisors 104 can move with a greater velocity than the molars 110. In another example, antiplasticizers can be incorporated into the aligner in the area of the incisors 104, but only on the lingual side 302 of the aligner 300. The combination of a higher modulus of elasticity on the lingual side 302 and a traditional modulus of elasticity on the buccal side 304 of the aligner 300 can cause the incisors 104 to move with a greater velocity than if the aligner 300 had a homogeneous modulus of elasticity in the area of incisors 104.

In some embodiments, the aligner 300 can be modified such that the surface of the aligner 300 that is in contact with the teeth 352 exhibits a high amount of friction (e.g., any relative motion between the aligner 300 and the teeth 352 can be added, increased, reduced or eliminated). By modifying the relative motion between the aligner 300 and the teeth 352, the movement of the teeth 352 can be more accurate and consistent, thereby reducing the wear time required to achieve the desired results. In some embodiments, the frictional surface can be imparted to the aligner 300 by physically roughening the surface of the aligner 300 that contacts the teeth 352 (e.g., by using a tool or other material to roughen the desired surface). In some embodiments, the frictional surface can be imparted to the aligner 300 by chemically roughening the surface of the aligner 300 that contacts the teeth 352 (e.g., by using a chemical to roughen the desired surface). In some embodiments, both the lingual surface 302 and the buccal surface 304 of the aligner 300 is roughened. In other embodiments, only one of the lingual surface 302 or the buccal surface 304 of the aligner 300 is roughened.

Figure 5:
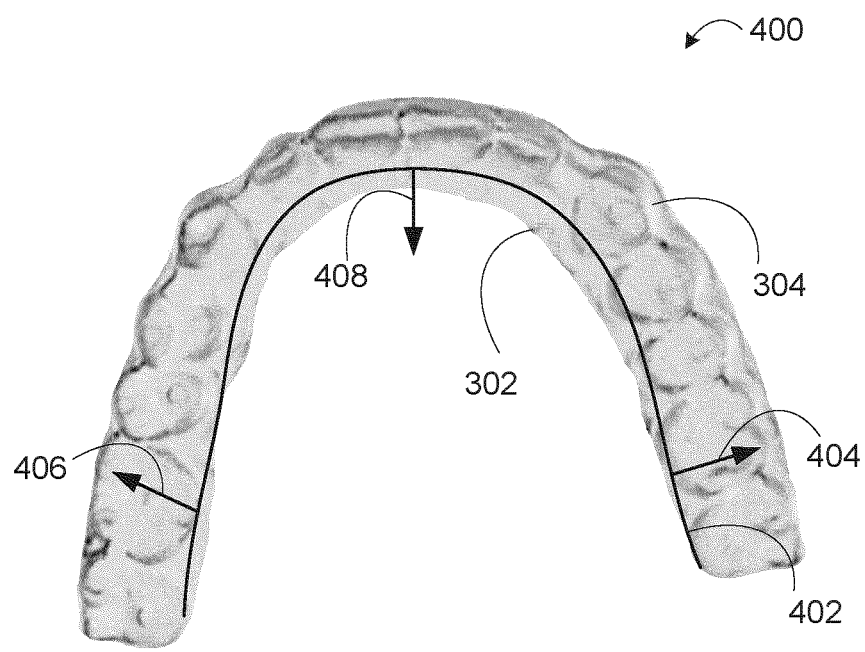
FIG. 5 is a top/occlusal view of a dental aligner including a metal insert, according to some embodiments.

Referring now to FIG. 5, a top/occlusal view of a dental aligner 400 is shown, according to some embodiments. The dental aligner 400 can be manufactured based on the treatment plan. In some embodiments, the aligner 400 can be modified such that an additional mechanical advantage is added to the material of the aligner 400. In some embodiments, the dental aligner 400 includes the integrated light source 356 of the dental aligner 354. Adding an additional mechanical advantage can serve to increase the overall elasticity of the aligner 400, thereby reducing the wear time required to achieve the desired results. In some embodiments, the overall elasticity of the aligner is increased (e.g., by using a honeycomb, corrugated, or lattice structure) so that the aligner has shape memory, such that the shape of the aligner can change while the aligner is worn and return to its original shape or substantially its original shape when not being worn. In some embodiments the additional mechanical advantage can be achieved by adding a reinforcement 402 to the lingual surface 302 of the aligner 400. The reinforcement 402 can be added to any surface of the aligner 400 (e.g., buccal, occlusal, front, bottom, and top).

The reinforcement 402 may be a metal material. Metals typically have a higher modulus of elasticity than plastics, therefore incorporating a metal reinforcement 402 into the aligner 400 increases the overall modulus of elasticity of the aligner 400 and aids in increasing the movement velocity, consistency, and predictability of the teeth 352, in addition to increasing the duration of the force on the teeth 352. Metals that may be incorporated into the aligner 400 as the reinforcement 402 include both non-shape memory alloys and shape memory alloys. A non-shape memory alloy has a limited or reduced ability to undergo deformation and return to its pre-deformation shape. Non-shape memory alloys include metals such as stainless steel and aluminum, and other metals typically used in a setting within the human body. Non-shape memory alloys can help the aligner 400 resist deformation by increasing the overall modulus of elasticity of the aligner 400.

A shape memory alloy has the ability to undergo deformation and return to its pre-deformation shape. Shape memory alloys include metals such as nickel-titanium (Nitinol), and copper-aluminum-nickel. A shape memory alloy can be used to do more than resist deformation of the aligner 400, like the non-shape memory metals. A shape memory metal could also be shaped such that when the aligner 400 is inserted over the teeth 352, the shape memory metal applies additional forces to the teeth 352 to promote more efficient movement of the teeth 352. This can be accomplished by heat treating different sections of the shape memory alloy in different ways according to known methods. In some embodiments, the shape memory alloy may be programmed using heat treatment methods to exert an external force on the molars 110, indicated by arrows 404 and 406, and an internal force, indicated by arrow 408, on the incisors 104. Using a shape memory alloy in this way can increase the movement velocity and movement precision of the teeth 352, thereby reducing the wear time required to achieve the desired results.

In some embodiments, the reinforcement 402 can be a plastic material. The plastic material used as the reinforcement 402 may have a higher modulus of elasticity than the plastic material used for the aligner 400, thereby increasing the overall modulus of elasticity of the aligner 400. Examples of a plastic reinforcement 402 include acrylonitrile butadiene styrene (ABS), polyurethane, polycarbonate, and polyethylene. The plastic material used as the reinforcement 402 may also include a shape memory plastic (e.g., linear block copolymers, cross-linked copolymers, and light induced shape memory polymers).

In some embodiments, vibration can be incorporated into the treatment method to aid in the movement of the teeth 352. Vibrating teeth for a short period of time each day can have the effect of stimulating cellular activity in the blood around the teeth such that the mouth is more susceptible to movement of the teeth. In this way, the velocity of the teeth can be increased, thereby reducing the wear time required to achieve the desired results. Such vibration can be achieved by using an available vibration device to stimulate the teeth prior to, during, or after wearing the aligner 300. For example, a vibration device worn by a user can provide vibrational forces of approximately 0.25 Newton's at a frequency of approximately thirty Hertz. A user that wears such a device for approximately twenty minutes per day prior to or while wearing a dental aligner according to a treatment plan can achieve the result of increasing the movement velocity of the teeth 352, thereby reducing the overall treatment time.

In some embodiments, chemical therapies can be incorporated into the treatment method to aid in the movement of teeth. Certain chemicals have been shown to increase the velocity of the movement of teeth. Non-limiting examples of these chemicals include vitamin D and prostaglandins. Other chemicals have been shown to decrease the velocity of the movement of teeth. Non-limiting examples of these chemicals include bisphosphonates, fluorides, and estrogen. In some embodiments, chemicals can be injected into the gum tissue near a certain tooth to either accelerate or inhibit the movement of the tooth. For example, the incisors 104 may need to move a significant amount relative to the molars 110. In such a case, a chemical that increases the velocity of tooth movement can be injected in the gums near the incisors 104, and a chemical that decreases the velocity of tooth movement can be injected in the gums near the molars 110. The movement of the incisors 104 can thus be increased relative to the movement of the molars 110 in such a way that would not be possible by using a conventional aligner alone.

In some embodiments, the chemicals that can increase or decrease tooth movement can be embedded in, attached to, surrounded by, applied to, or otherwise on, the aligner 300 such that the aligner 300 can slowly release the chemicals over time. In some embodiments, the chemicals that can increase or decrease tooth movement can be applied to the aligner 300 such that the teeth 352 are in contact with the chemicals. In this way, the chemicals would interact directly with the teeth and either accelerate or inhibit the movement accordingly.

In some embodiments, the modifications to the aligner 300 and the overall treatment method can be incorporated as standalone modifications. In some embodiments, the modifications to the aligner 300 and the overall treatment method can be used in combination with each other. For example, a treatment method may provide ten aligners to a user. The first aligner can be a traditional aligner, made with a traditional material and traditional material thickness so the user can acclimate to wearing an aligner. The second aligner can include a thicker material combined with antiplasticizers to increase the modulus of elasticity of the aligner and increase the movement velocity of the teeth.

The third aligner can include antiplasticizers and a frictional surface to contact the teeth, along with instructions for the user to use a vibration device for twenty minutes each day. The fourth aligner can include a shape memory metal along the lingual surface of the aligner, along with instructions to use a light therapy device for ten minutes each day while wearing the aligner.

The fifth aligner can include an instruction to receive a chemical injection, where the user could visit a professional to inject chemicals at different locations in the mouth of the user to facilitate or inhibit the movement of specific teeth or groups of teeth. The fifth aligner can also include thicker material in the areas in which movement is facilitated by the chemical injection and thinner material in the areas in which movement is inhibited by the chemical injection.

The sixth aligner can include a traditional aligner with instructions to use a vibration device for thirty minutes per day and a light therapy device for twenty minutes per day. The seventh aligner can include a non-shape memory metal along the lingual surface of the aligner combined with a frictional surface along the buccal surface of the aligner. Instructions included with the seventh aligner may instruct the user to use a vibration device for twenty minutes per day.

The eighth aligner can include a composite of metals along the lingual surface of the aligner. For example, the aligner may include shape memory metals along the lingual surfaces of the molars and a non-shape memory metal along the lingual surface of the incisors, cuspids, and bicuspids to facilitate different movement velocities between the different groups of teeth.

The ninth aligner can include antiplasticizers and instructions to the user to use a light therapy device for ten minutes per day. The tenth and final aligner can include a thicker material and additional chemical injections to facilitate the final positioning of the teeth of the user.

It will be appreciated that any of the embodiments disclosed herein can be combined with one another. For example, the treatment plan can dictate, and an aligner created based on the treatment plan can include, the use of the integrated light source 356, the external light source 358, material having a variable thickness, material preventing the aligner from permanently deforming under load, the use of antiplasticizers, an additional mechanical advantage (e.g., the reinforcement 402), and any other feature disclosed herein.

Figure 6:
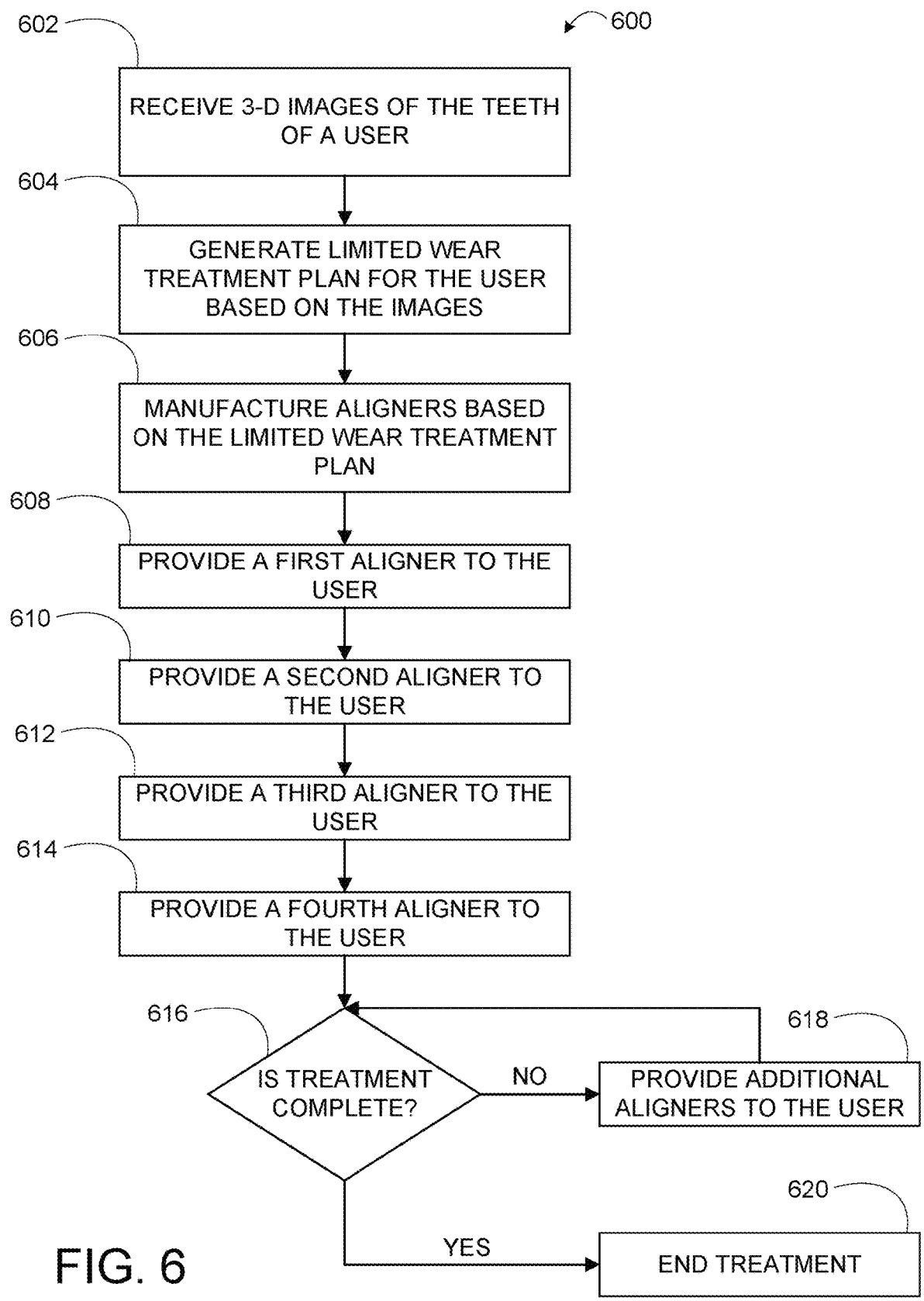
FIG. 6 is a flow diagram of a method for creating a limited wear dental aligner, according to some embodiments.

Referring now to FIG. 6, a flow diagram of a method 600 for creating dental aligners is shown, according to some embodiments. At 602, 3-D images of the teeth of a user are received. In order for dental aligners to properly reposition the teeth of the user, an accurate model of the initial position of the teeth of the user must be generated. In some embodiments, the user may have access to a 3-D scanning system (e.g., by visiting a location associated with a manufacturer of dental aligners, using a mobile scanning system), and the 3-D scanning system is configured to scan the teeth of the user to create electronic images of the teeth of the user. In some embodiments, the user may not have access to a 3-D scanning system or prefer not to use such a system. In such cases, the user can create physical dental impressions of their teeth. For example, the impressions can be created by a professional in a professional office setting (e.g., at a dentist or orthodontist office). In another example, the impressions can be created by the user using a dental impression kit. After the user makes the impressions, the impressions can be scanned by 3-D scanner to create electronic images of the teeth of the user.

At 604, a limited wear treatment plan for the user is generated based on the images of the teeth of the user. After the 3-D images of the teeth of the user are received, a computer model of the teeth of the user is generated (e.g., the 3-D model 100). The computer model can include the 3-D images of the initial position of the teeth of the user. The computer model can also include the 3-D images of the desired final position of the teeth of the user. Based on the 3-D images of the initial position and desired final position of the teeth of the user, a limited wear treatment plan for the user can be created. Creating the limited wear treatment plan can include creating additional 3-D images of the teeth of the user to depict the incremental movement of the teeth during the treatment plan from the initial position to the desired final position. The limited wear treatment plan can include using one or more aligners corresponding to the 3-D images of the teeth of the user to reposition the teeth of the user over the duration of the limited wear treatment plan.

Compared to a conventional treatment plan, the limited wear treatment plan may be based on wearing the aligners continuously for a duration of less than twenty-two hours per day. For example, the limited wear treatment plan may be generated based on a continuous, daily wear time of approximately ten hours. In some embodiments, the limited wear treatment plan may be generated based on a continuous, daily wear time of between approximately nine to eleven hours, approximately eight hours to twelve hours, approximately seven to thirteen hours, approximately six to fourteen hours, or approximately five to fifteen hours. The time of day during which the user wears the aligners is irrelevant, provided that the user wears the aligner for the prescribed period continuously. For example, the user can wear the aligners continuously during the day, at night, and/or while sleeping. For example, the treatment plan can recommend continuously wearing the aligners during a night time period when most users would typically be sleeping, such as from 10:00 pm to 8:00 am, from 9:00 pm to 7:00 am, from 8:00 pm to 6:00 am, and so on. The advantage of being able to wear the aligners during a night time period is that users typically do not engage in any activities during this time period that would require removing the aligner from their mouth, such as eating. Since users do not typically need to remove their aligners during the night time period, users are more likely to comply with a ten-hour continuous-wear daily wear treatment plan than a twenty-two hour non-continuous-wear daily wear treatment plan, and therefore the users are more likely to continue treatment as intended.

In some embodiments, the limited wear treatment plan includes four aligners corresponding to each 3-D image used to create the limited wear treatment plan. Each of the four aligners has the same geometry based on the 3-D image, with the limited wear treatment plan providing additional information regarding the aligners. The additional information includes the aligner material, thickness, recommended continuous wear time per day, and recommended number of days to wear each aligner. The duration of the treatment plan is dependent on both the overall daily wear time and the continuous wear time per day, and the user may be provided a choice of how to implement the treatment. For example, achieving the desired tooth movement for a user may take approximately six months if the user wears the aligners for twenty-two hours per day, even though the wear time may not be continuous. Achieving the same desired tooth movement may take one year if the user wears the aligners for ten hours per day. The user may be presented with various other options to reduce the daily wear time requirement from twenty-two hours per day. For example, if the user wears the aligners for twelve hours per day, the overall treatment duration may be ten months. If the user wears the aligners for six hours per day, the overall treatment duration may be fourteen months. After being presented with the treatment plan options, the user can choose which option is best suited for the lifestyle of the user. Additionally, if the user desires to change the amount of daily wear time during the treatment plan, the treatment plan can be updated or modified to reflect the choice of the user, and the overall treatment duration can be changed based on the user's choice.

At 606, the aligners are manufactured based on the treatment plan. Any appropriate technique may be used to manufacture the aligners. For example, the aligners may be manufactured by 3D printing physical models of the teeth of the user based on the computer model, and then molding plastic aligners (e.g., by a thermoforming process) using the physical models.

At 608, a first aligner is provided to the user. The geometry of the first aligner corresponds to the 3-D model of the teeth associated with the treatment plan. For example, the first aligner may be the initial aligner a user wears as part of the treatment plan. The geometry of the first aligner corresponds to the geometry of the 3-D model representing the first step in the prescribed treatment plan. In some embodiments, the first aligner is manufactured using a polymeric material comprising a thickness of approximately 0.5 mm to be worn for two weeks for approximately eight to twelve hours per day. In some embodiments, the first aligner is manufactured using a polymeric material comprising a thickness of approximately 0.625 mm to be worn for two weeks for approximately eight to twelve hours per day. In some embodiments, the first aligner is manufactured using a polymeric material comprising a thickness of approximately 0.75 mm to be worn for two weeks for approximately eight to twelve hours per day.

At 610, a second aligner is provided to the user. The geometry of the second aligner is substantially similar to the geometry of the first aligner. In some embodiments, the second aligner is manufactured using a polymeric material comprising a thickness of approximately 0.625 mm to be worn for two weeks for approximately eight to twelve hours per day. In some embodiments, the second aligner is manufactured using a polymeric material comprising a thickness of approximately 0.75 mm to be worn for two weeks for approximately eight to twelve hours per day. In some embodiments, the second aligner is manufactured using a polymeric material comprising a thickness of approximately 0.5 mm to be worn for two weeks for approximately eight to twelve hours per day.

At 612, a third aligner is provided to the user. The geometry of the third aligner is substantially similar to the geometry of the first and second aligners. In some embodiments, the third aligner is manufactured using a polymeric material comprising a thickness of approximately 0.75 mm to be worn for two weeks for approximately eight to twelve hours per day. In some embodiments, the third aligner is manufactured using a polymeric material comprising a thickness of approximately 0.625 mm to be worn for two weeks for approximately eight to twelve hours per day. In some embodiments, the third aligner is manufactured using a polymeric material comprising a thickness of approximately 0.5 mm to be worn for two weeks for approximately eight to twelve hours per day.

At 614, a fourth aligner is provided to the user. The geometry of the fourth aligner is substantially similar to the geometry of the first, second and third aligners. In some embodiments, the fourth aligner is manufactured using a polymeric material comprising a thickness of approximately 0.75 mm to be worn for two weeks for approximately eight to twelve hours per day. In some embodiments, the fourth aligner is manufactured using a polymeric material comprising a thickness of approximately 0.625 mm to be worn for two weeks for approximately eight to twelve hours per day. In some embodiments, the fourth aligner is manufactured using a polymeric material comprising a thickness of approximately 0.5 mm to be worn for two weeks for approximately eight to twelve hours per day.

In some embodiments, the aligners provided to the user in steps 608-614 can include additional thicknesses. For example, a set of aligners may include a first aligner comprising a thickness of 0.1 mm-0.3 mm, a second aligner comprising a thickness of 0.25-0.625 mm, and a third aligner comprising a thickness of 0.25-0.0625 mm. In some embodiments, the second aligner and the third aligner can have the same thickness.

As another example, a set of aligners may include a first aligner comprising a thickness of 0.3 mm-0.5 mm, a second aligner comprising a thickness of 0.7 mm-0.9 mm, and a third aligner comprising a thickness of 0.7 mm-0.9 mm. In some embodiments, the second aligner and the third aligner can have the same thickness.

As a further example, a set of aligners may include a first aligner comprising a thickness of 0.4 mm-0.8 mm, a second aligner comprising a thickness of 0.5 mm-0.9 mm, a third aligner comprising a thickness of 0.6 mm-1.5 mm, and a fourth aligner comprising a thickness of 0.6 mm-1.5 mm.

In some embodiments, the aligners provided to the user in steps 608-614 are provided to the user simultaneously such that the user can switch between aligners according to the treatment plan. In some embodiments, the aligners provided to the user in steps 608-614 are provided to the user sequentially such that the user completes wearing one aligner prior to (or concurrently with) receiving the next aligner. In some embodiments, after approval of the treatment plan and approval of the aligners by a dental or orthodontic professional, the aligners are provided directly to the user without first being provided to a dental or orthodontic professional.

At 616, a determination is made regarding whether the treatment for the user is complete. The determination may be made by a dental or orthodontic professional, in some embodiments, upon seeing the user at an office visit. In some embodiments, the determination of whether the treatment is complete is made by the aligner manufacturer by comparing the configuration of the teeth of the user to the final 3-D model. In some embodiments, after the user wears the last aligner according to the treatment plan, the user can decide to stop further treatment. If the determination is made that the treatment is complete, the treatment ends at 620.

If the determination is made that the treatment is not complete (e.g., the user still has more aligners to wear according to the treatment plan), the additional aligners are provided to the user at 618. In some embodiments, the additional aligners are provided to the user in a manner similar to that described in steps 608-614. Furthermore, the user may be provided with a plurality of aligners simultaneously. For example, the user may be provided with all aligners associated with the treatment plan at the beginning of the treatment. In some embodiments, the user may be provided with a first predetermined number of aligners at the beginning of the treatment. When, according to the treatment plan, the user is almost finished wearing the first predetermined number of aligners, the aligner manufacturer may send the user a second predetermined number of aligners.

In one example embodiment, a treatment plan for a user comprises four sets of aligners. The user may receive all aligners simultaneously, or over a period of time, as described. The first set of aligners may include a first aligner, a second aligner, a third aligner, and a fourth aligner, and the first set of aligners may comprise a substantially similar geometry. In some embodiments, first set of aligners are all manufactured using the same polymeric material. In some embodiments, the first set of aligners are manufactured using different polymeric materials. The first aligner may be 0.5 mm thick and should be worn for approximately ten continuous hours per day for two weeks. The second aligner may be 0.625 mm thick and should be worn for approximately ten continuous hours per day for two weeks. The third aligner may be 0.75 mm thick and should be worn for approximately ten continuous hours per day for two weeks. The fourth aligner may be 0.75 mm thick and should be worn for approximately ten continuous hours per day for two weeks.

The second set of aligners may include a fifth aligner, a sixth aligner, a seventh aligner, and an eighth aligner, and the second set of aligners may comprise a substantially similar geometry. The geometry of the fifth aligner, the sixth aligner, the seventh aligner, and the eighth aligner is different than the geometry of the first aligner, the second aligner, the third aligner, and the fourth aligner. The geometry is different for the second set of aligners because the second set of aligners is configured to move the teeth from a first position to a second position and the first set of aligners is configured to move the teeth from an initial position to the first position. Accordingly, the second set of aligners may be produced using a dental mold that is sized and shaped differently than a dental mold used to make the first set of aligners. In some embodiments, the second set of aligners are all manufactured using the same polymeric material. In some embodiments, the second set of aligners are manufactured using different polymeric materials. The fifth aligner may be 0.75 mm thick and should be worn for approximately eight continuous hours per day for one week. The sixth aligner may be 0.5 mm thick and should be worn for approximately eleven continuous hours per day for two weeks. The seventh aligner may be 0.625 mm thick and should be worn for approximately ten continuous hours per day for one week. The eighth aligner may be 0.75 mm thick and should be worn for approximately ten continuous hours per day for two weeks.

The third set of aligners may include a ninth aligner, a tenth aligner, an eleventh aligner, and a twelfth aligner, and the third set of aligners may comprise a substantially similar geometry. The geometry of the third set of aligners is different than the geometry of the second set of aligners because the third set of aligners is configured to move the teeth from the second position to a third position and the second set of aligners is configured to move the teeth from the first position to the second position. Accordingly, the third set of aligners may be produced using a dental mold that is sized and shaped differently than a dental mold used to make the second set of aligners. In some embodiments, the third set of aligners are all manufactured using the same polymeric material. In some embodiments, the third set of aligners are manufactured using different polymeric materials. The ninth aligner may be 0.625 mm thick and should be worn for approximately twelve continuous hours per day for two weeks. The tenth aligner may be 0.75 mm thick and should be worn for approximately ten continuous hours per day for one week. The eleventh aligner may be approximately 0.625 mm thick and should be worn for approximately nine continuous hours per day for two weeks. The twelfth aligner may be approximately 0.5 mm thick and should be worn for approximately ten continuous hours per day for two weeks.

The fourth set of aligners may include a thirteenth aligner, a fourteenth aligner, a fifteenth aligner, and a sixteenth aligner, and the fourth set of aligners may comprise a substantially similar geometry. The geometry of the fourth set of aligners is different than the geometry of the third set of aligners because the fourth set of aligners is configured to move the teeth from the third position to a fourth position and the third set of aligners is configured to move the teeth from the second position to the third position. Accordingly, the fourth set of aligners may be produced using a dental mold that is sized and shaped differently than a dental mold used to make the third set of aligners. In some embodiments, the fourth set of aligners are all manufactured using the same polymeric material. In some embodiments, the fourth set of aligners are manufactured using different polymeric materials. The thirteenth aligner may be 0.5 mm thick and should be worn for approximately twelve continuous hours per day for two weeks. The fourteenth aligner may be 0.5 mm thick and should be worn for approximately eleven continuous hours per day for one week. The fifteenth aligner may be 0.625 mm thick and should be worn for approximately twelve continuous hours per day for two weeks. The sixteenth aligner may be 0.75 mm thick and should be worn for approximately nine continuous hours per day for two weeks.

As one of ordinary skill would understand, the combinations of aligners described in the example embodiment are not intended to be limiting. Accordingly, any of the combinations described above may be used in various sets of aligners. Additionally, the aligner thickness may be modified such that an aligner may comprise a thickness of between 0.5-1.0 mm. The aligner thickness may also be modified such that an aligner may comprise a thickness of between 0.25 mm-2.5 mm. The continuous wear time may also be modified based on the treatment plan. Furthermore, any of the movement stimuli described herein, such as vibration, light, physical modifications to the aligner (e.g., modifying aligner thickness, changing the physical structure, adding antiplasticizers, modifying the aligner surface, etc.), reinforcing structures, and chemicals may be incorporated into the treatment plan and aligners as described with respect to FIG. 6. For example, the first aligner or the first set of aligners can include one or more of the movement stimuli. An intermediate aligner or an intermediate set of aligners can include one or more of the movement stimuli. A final aligner or a final set of aligners can include one or more of the movement stimuli.

In some embodiments, a limited wear treatment plan as described provides a user with satisfactory results. In some embodiments, the satisfactory results are similar to those obtained using a conventional twenty-two hour daily wear treatment plan. In some embodiments, the limited wear treatment plan may require a longer treatment duration than the conventional treatment plan. For example, treatment with a limited wear treatment plan may take 40%-100% longer to achieve the same results as a treatment with a conventional treatment plan.

As utilized herein, the term "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. Furthermore, relative terminology, such as "about" and "substantially" should be given their ordinary meaning. However, to the extent the ordinary meaning of such terminology is unclear, it can be assumed that such terminology at least means "within 20%," though it is not Applicant's intent to limit such terminology to only this meaning and it will be appreciated that such terminology may refer to ranges greater than "within 20%."

It should be noted that the term "exemplary," "example," and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the Figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that the construction and arrangement of the systems, apparatuses, and methods shown in the various exemplary embodiments is illustrative only. Additionally, any element disclosed in one embodiment may be incorporated or utilized with any other embodiment disclosed herein. For example, any of the exemplary embodiments described in this application can be incorporated with any of the other exemplary embodiment described in the application. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for orthodontic treatment comprising:
presenting, by a treatment planning computing system, a user with a first aligner treatment plan option and a second aligner treatment plan option such that the user is able to select one of the first aligner treatment plan option or the second aligner treatment plan option; and
providing a first set of aligners and a second set of aligners of a plurality of aligners directly to the user after an aligner treatment plan is generated based on the selection and is approved by a dentist or an orthodontist and without the first set of aligners first being provided to the approving dentist or orthodontist, the first set of aligners and the second set of aligners comprising a respective first aligner, a respective second aligner, and a respective third aligner;
wherein the first set of aligners have a first geometric shape generated from a first single physical dental model;
wherein the first set of aligners are configured to move a tooth of the user from a first position to a second position;
wherein the second set of aligners have a second geometric shape generated from a second single physical dental model;
wherein the second set of aligners are configured to move the tooth of the user from the second position to a third position;
wherein the first set of aligners and the second set of aligners are provided to the user simultaneously;
wherein the first set of aligners and the second set of aligners are created using the same type of polymeric material;
wherein the first aligner of the first set of aligners has a first thickness that is the same across the entire first aligner of the first set of aligners, the second aligner of the first set of aligners has a second thickness that is the same across the entire second aligner of the first set of aligners, and the third aligner of the first set of aligners has a third thickness that is the same across the entire third aligner of the first set of aligners;
wherein the first aligner of the second set of aligners has the first thickness that is the same across the entire first aligner of the second set of aligners, the second aligner of the second set of aligners has the second thickness that is the same across the entire second aligner of the second set of aligners, and the third aligner of the second set of aligners has the third thickness that is the same across the entire third aligner of the second set of aligners;

wherein the first thickness is less than the second thickness and the third thickness, and wherein the second thickness is the same as the third thickness;

wherein the aligner treatment plan is generated to have an overall treatment duration that is determined by the treatment planning computing system based on the selection by the user from the first aligner treatment plan option comprising wearing the aligners of the plurality of aligners daily for approximately twenty-two non-continuous hours per day, and the second aligner treatment plan option comprising wearing the aligners of the plurality of aligners daily for ten continuous hours per day, wherein the second aligner treatment plan option is based on wearing the aligners of the plurality of aligners during a night time period including when the user sleeps based on the user selecting the second aligner treatment plan option, wherein the first aligner treatment plan option and the second aligner treatment plan option have a respective planned final position for teeth of the user, wherein the respective planned final position for the first aligner treatment plan option is the same as the planned final position for the second aligner treatment plan option;

wherein the plurality of aligners are manufactured after generation of the aligner treatment plan and following the selection by the user from the first aligner treatment plan option and the second aligner treatment plan option; and wherein the different thicknesses and wear times of the respective first set of aligners and the respective second set of aligners cause the tooth of the user to move from the first position to the second position and from the second position to the third position even though the aligners are only worn for ten continuous hours per day.

2. The method of claim 1, wherein the first aligner is provided to be worn by the user for a first period of the overall treatment duration, the second aligner is provided to be worn by the user for a second period of the overall treatment duration after the first period, and the third aligner is provided to be worn by the user for a third period of the overall treatment duration after the second period.

3. The method of claim 2, wherein the first period, the second period, and the third period are the same amount of time.

4. The method of claim 3, wherein each of the first period, the second period, and the third period is one week or two weeks.

5. The method of claim 1, wherein the first thickness is between 0.4 mm and 0.625 mm and the second thickness is between 0.5 mm and 2.5 mm.

6. The method of claim 1, wherein the first thickness is between approximately 0.5 mm and 0.625 mm and the second thickness is between approximately 0.625 mm and 2.5 mm.

7. The method of claim 1, wherein the second thickness and the third thickness is about 50% thicker than the first thickness.

8. The method of claim 1, wherein the second thickness and the third thickness is about twice as thick as the first thickness.

9. The method of claim 1, further comprising:
providing a third set of aligners to the user, the third set of aligners comprising a fourth aligner, a fifth aligner, and a sixth aligner;

wherein the fourth aligner, the fifth aligner, and the sixth aligner are created using a third single physical dental model, the third single physical dental model being a different shape than the first single physical dental model and the second single physical dental model;

wherein the fourth aligner, the fifth aligner, and the sixth aligner have a third geometric shape generated from the third single physical dental model, and wherein the third set of aligners is provided to the user at the same time as the first set of aligners and the second set of aligners.

10. A method for orthodontic treatment comprising:

receiving, by a user from a treatment planning computing system, a presentment of a first aligner treatment plan option and a second aligner treatment plan option such that the user is able to select one of the first aligner treatment plan option or the second aligner treatment plan option;

receiving, by the user after an aligner treatment plan is generated based on the selection and is approved by a dentist or an orthodontist, a first set of aligners and a second set of aligners sent directly to the user without the first set of aligners and the second set of aligners first being provided to the approving dentist or orthodontist, the first set of aligners and the second set of aligners each comprising a respective first aligner, a respective second aligner, and a respective third aligner, wherein the first aligner of the first set of aligners has a first thickness that is the same across the entire first aligner of the first set of aligners, the second aligner of the first set of aligners has a second thickness that is the same across the entire second aligner of the first set of aligners, and the third aligner of the first set of aligners has a third thickness that is the same across the entire third aligner of the first set of aligners;

wherein the first set of aligners have a first geometric shape generated from a first single physical dental model;

wherein the first set of aligners are configured to move a tooth of the user from a first position to a second position;

wherein the second set of aligners have a second geometric shape generated from a second single physical dental model;

wherein the second set of aligners are configured to move the tooth of the user from the second position to a third position;

wherein the first aligner of the second set of aligners has the first thickness that is the same across the entire first aligner of the second set of aligners, the second aligner of the second set of aligners has the second thickness that is the same across the entire second aligner of the second set of aligners, and the third aligner of the second set of aligners has the third thickness that is the same across the entire third aligner of the second set of aligners;

wherein the first thickness is less than the second thickness and the third thickness, and wherein the second thickness is the same as the third thickness;

wherein the first set of aligners and the second set of aligners are created from the same type of polymeric material;

wearing, by the user, the first aligner of the first set of aligners for a first period of an overall treatment duration;

wearing, by the user, the second aligner of the first set of aligners for a second period of the overall treatment duration after the first period; and wearing, by the user, the third aligner of the first set of aligners for a third period of the overall treatment duration after the second period;

wherein each of the first aligner, the second aligner, and the third aligner is sent to the user simultaneously;

wherein the aligner treatment plan is generated by the treatment planning computing system to have the overall treatment duration that is determined based on the selection by the user from the first aligner treatment plan option comprising wearing the aligners of the first set of aligners daily for approximately twenty-two non-continuous hours per day, and the second aligner treatment plan option comprising wearing the aligners of the first set of aligners daily for ten continuous hours per day, wherein the second aligner treatment plan option is based on wearing the aligners of the first set of aligners during a night time period including when the user sleeps based on the user selecting the second aligner treatment plan option, wherein the first aligner treatment plan option and the second aligner treatment plan option have a respective planned final position for teeth of the user, wherein the respective planed final position for the first aligner treatment plan option is the same as the planned final position for the second aligner treatment plan option;

wherein the first set of aligners and the second set of aligners are manufactured after generation of the aligner treatment plan and following the selection by the user from the first aligner treatment plan option and the second aligner treatment plan option; and wherein the different thicknesses and wear times of the respective first set of aligner and the respective second set of aligners cause the tooth of the user to move from the first position to the second position and from the second position to the third position.

11. The method of claim 10, wherein the first period, the second period, and the third period are the same amount of time.

12. The method of claim 11, wherein each of the first period, the second period, and the third period are one week or two weeks.

13. The method of claim 10, wherein the first thickness is between 0.4 mm and 0.625 mm and the second thickness is between 0.5 mm and 2.5 mm.

14. The method of claim 13, wherein the first thickness is between approximately 0.5 mm and 0.625 mm and the second thickness is between approximately 0.625 mm and 1.0 mm.

15. The method of claim 10, wherein the second thickness and the third thickness are about 50% thicker than the first thickness.

16. The method of claim 10, wherein the selection is of the second aligner treatment plan option, and wherein the first aligner, the second aligner, and the third aligner are worn by the user for ten hours per day.

17. The method of claim 16, wherein a fourth aligner is provided to be worn for a fourth period after the third period, wherein the first period and the second period are the same amount of time and the third period and the fourth period are the same amount of time, the first period and the second period being a different amount of time than the third period and the fourth period, and wherein the third period and the fourth period are at least twice as long as the first period and the second period.

18. The method of claim 10, further comprising:
receiving, by the user, a third set of aligners, the third set of aligners comprising a fourth aligner, a fifth aligner, and a sixth aligner;

wherein the fourth aligner, the fifth aligner, and the sixth aligner are created using a third single physical dental model, the third single physical dental model being a different shape than the first single physical dental model and the second single physical dental model;

wherein the fourth aligner, the fifth aligner, and the sixth aligner have a third geometric shape generated from the third single physical dental model; and wherein the third geometric shape of the fourth aligner, the fifth aligner, and the sixth aligner is different than the first and second geometric shapes.

19. A method for orthodontic treatment comprising:
presenting, by a treatment planning computing system, a user with a first aligner treatment plan option and a second aligner treatment plan option such that the user is able to select one of the first aligner treatment plan option or the second aligner treatment plan option; and providing a first set of aligners and a second set of aligners directly to the user after an aligner treatment plan is generated based on the selection and is approved by a dentist or an orthodontist and without the first set of aligners or the second set of aligners first being provided to the approving dentist or orthodontist, wherein the first set of aligners consist of a first aligner, a second aligner, a third aligner, and a fourth aligner, the first aligner having a first thickness that is the same across the entire first aligner of the first set of aligners, the second aligner having a second thickness that is the same across the entire second aligner of the first set of aligners, the third aligner having a third thickness that is the same across the entire third aligner of the first set of aligners, and the fourth aligner having a fourth thickness that is the same across the entire fourth aligner of the first set of aligners, the first aligner, the second aligner, the third aligner, and the fourth aligner configured to move a tooth of the user when worn in sequence, wherein the first set of aligners and the second set of aligners are created from the same type of polymeric material;

wherein the second thickness is thicker than the first thickness, the third thickness is thicker than the second thickness, and the fourth thickness is the same as the third thickness;

wherein the first set of aligners have a first geometric shape generated from a first single physical dental model;

wherein the first set of aligners are configured to move the tooth of the user from a first position to a second position;

wherein the second set of aligners consist of a fifth aligner, a sixth aligner, a seventh aligner, and an eighth aligner;

wherein the fifth aligner, the sixth aligner, the seventh aligner, and the eighth aligner have a second geometric shape generated from a second single physical dental model, the second geometric shape being a different shape than the first geometric shape;

wherein the fifth aligner of the second set of aligners has the first thickness that is the same across the entire fifth aligner of the second set of aligners, the sixth aligner of the second set of aligners has the second thickness that is the same across the entire sixth aligner of the second set of aligners, the seventh aligner of the second set of aligners has the third thickness that is the same across the entire seventh aligner of the second set of aligners, and the eighth aligner of the second set of aligners has the fourth thickness that is the same across the entire eighth aligner of the second set of aligners;

wherein the second set of aligners are configured to move the tooth of the user from the second position to a third position;

wherein the first set of aligners and the second set of aligners are provided to the user simultaneously;

wherein the aligner treatment plan is generated by the treatment planning computing system to have an overall treatment duration that is determined based on the selection by the user from the first aligner treatment plan option comprising wearing the aligners of the first set of aligners and the second set of aligners daily for approximately twenty-two non-continuous hours per day, and the second aligner treatment plan option comprising wearing the aligners of the first set of aligners and the second set of aligners daily for ten continuous hours per day, wherein the second aligner treatment plan option is based on wearing the aligners of the first set of aligners during a night time period including when the user sleeps based on the user selecting the second aligner treatment plan option, wherein the first aligner treatment plan option and the second aligner treatment plan option have a respective planned final position for teeth of the user, wherein the respective planned final position for the first aligner treatment plan option is the same as the planned final position for the second aligner treatment plan option;

wherein the first set of aligners and the second set of aligners are manufactured after generation of the aligner treatment plan and following the selection by the user from the first aligner treatment plan option and the second aligner treatment plan option; and wherein the different thicknesses and wear times of the respective first set of aligner and the respective second set of aligners cause the tooth of the user to move from the first position to the second position and from the second position to the third position even though the aligners are only worn for ten continuous hours per day.

20. The method of claim 19, wherein the fourth thickness and the third thickness are about 50% thicker than the first thickness.

21. The method of claim 19, wherein the first aligner is provided to be worn for a first period of the overall treatment duration, the second aligner is provided to be worn for a second period of the overall treatment duration after the first period, the third aligner is provided to be worn for a third period of the overall treatment duration after the second period, and the fourth aligner is provided to be worn for a fourth period of the overall treatment duration after the third period.

22. The method of claim 21, wherein the first period, the second period, the third period, and the fourth period are the same amount of time.

23. The method of claim 21, wherein the first period and the second period are the same amount of time and the third period and the fourth period are the same amount of time, the first period and the second period being a different amount of time than the third period and the fourth period.

24. The method of claim 23, wherein the third period and the fourth period are at least twice as long as the first period and the second period.

25. The method of claim 19, wherein the first thickness is about 0.5 mm thick, wherein the second thickness is about 0.625 mm thick, wherein the third thickness is about 0.75 mm thick, and wherein the fourth thickness is about 0.75 mm thick.

26. The method of claim 19, wherein the first thickness is 0.5 mm thick, wherein the second thickness is 0.625 mm thick, wherein the third thickness is 0.75 mm thick, and wherein the fourth thickness is 0.75 mm thick.

* * * * *